United States Patent [19]

Walstra et al.

[11] Patent Number: 5,111,699
[45] Date of Patent: May 12, 1992

[54] SENSOR FOR MEASURING THE PRESSURE OF A MEDIUM

[75] Inventors: Hidde Walstra, Almelo; Arie J. Kolling, Enschede, both of Netherlands

[73] Assignee: Texas Instruments Incorporated, Dallas, Tex.

[21] Appl. No.: 679,500

[22] Filed: Apr. 1, 1991

[30] Foreign Application Priority Data

Apr. 5, 1990 [NL] Netherlands ............... 9000802

[51] Int. Cl.⁵ .................... G01L 9/08; G01M 15/00
[52] U.S. Cl. ................ 73/754; 73/119 A; 73/706; 73/756; 73/DIG. 4
[58] Field of Search ......... 73/727, 119 A, 721, 73/115, 147, 706, 720, 726, 754, 756, DIG. 4; 338/4

[56] References Cited

U.S. PATENT DOCUMENTS

| 2,068,744 | 1/1937 | Gutzke ............... 73/DIG. 4 |
| 2,454,264 | 11/1948 | Stigter ............... 171/327 |
| 3,198,013 | 8/1965 | Erdely ............... 73/398 |
| 4,483,480 | 11/1984 | Yasuhara et al. ............... 73/754 |
| 4,621,519 | 11/1986 | Phillips ............... 73/35 |

FOREIGN PATENT DOCUMENTS 357345  7/1980  Austria .
312509  5/1929  United Kingdom .

OTHER PUBLICATIONS

Messtechnik, vol. 78, No. 1, Jan. 1970, (Munchen, Germany) W. Diehl "Beitrag zur statishen Eichung von piezoelecktrischen Druckaufnehmern mit Quarz und Turmalin", pp. 4-9. See p. 6, Par. 3.2; FIG. 4.

Primary Examiner—Donald O. Woodiel
Attorney, Agent, or Firm—Russell E. Baumann; Rene E. Grossman; Richard L. Donaldson

[57] ABSTRACT

A pressure sensor particularly for measuring pressure within a diesel fuel pump comprises a screw-threaded bolt having a head and a shank and having a bore extending through the bolt through the head and shank. A transducer comprising a piezoelement is disposed in the bore, an electrical terminal extends from the bore through the head of the bolt, an electrical insulator is disposed between the transducer and bore, a threaded element positions one side of the transducer in the bore against the terminal, a spring in the bore extends from the shank end of the bore to bear against the opposite side of the transducer, and an incompressible material surrounds the spring in the bore to transmit a pressure force from a fluid pressure zone in the pump through the shank end of the bore to the transducer to provide a signal from the transducer representative of the pressure in the zone.

11 Claims, 1 Drawing Sheet

SENSOR FOR MEASURING THE PRESSURE OF A MEDIUM

BACKGROUND OF THE INVENTION

The field of the invention is that of pressure sensors using piezoelements, and the invention relates more particularly to pressure sensors adapted for use in the wall of a pressure zone housing or the like.

A sensor is known for measuring the pressure of a medium, in particular for measuring the changing pressure in a diesel injection pump, comprising a screw bolt with an axial bore extending through the entire head and shank of the bolt, a transducer placed inside said bore which can convert a pressure change into an electrical signal, an electric cable leading via the bolt head to the transducer, and a non-compressible mass which is provided in the bore and extends from the pressure measurement side of the bolt up to the transducer.

Such a sensor is known from international patent application WO-83/00225. See also the commonly assigned, copending U.S. patent application Ser. No. 07/485,117, filed Feb. 23, 1990.

Screwing such a sensor at the position of a vent screw through an opening in the wall of a diesel injection pump means that when the diesel engine is turning this sensor can provide data on the injection moment, the wear on the pump, the opening pressure of the injector and the wear on the injector.

In the case of the known sensor the transducer has the pressure-sensitive element placed in a Wheatstone bridge circuit. The fitting of the Wheatstone bridge in the bolt bore is difficult to incorporate in an easy and automated production method.

BRIEF SUMMARY OF THE INVENTION

The object of the invention is to eliminate these disadvantages and provide a sensor design which is easy to assemble from parts, and which is resistant to great pressure differences and to the effect of aggressive gases or liquid (diesel resistance).

According to the invention, the sensor mentioned in the preamble is to this end characterized in that the transducer in the form of a piezoelement is pressed by a contact spring onto the end face of an electrical connecting pin projecting through the bolt head, which pin is fixed inside the cavity of the bolt head by a securing nut with the interposition of an insulating element.

A noncompressible or incompressible mass preferably fills the bore from the end face of the bolt shank up to a sealing ring fitted round the connecting pin, and the noncompressible mass is made up of two parts, namely a plug made of a diesel-resistant material which is vulcanizable at room temperature, for shutting off the end of the shank bore, and a gel-type two-component elastomer between said plug and the sealing ring.

The two-component elastomer can be poured into the bore in a water-thin state and de-aerated (or poured in under vacuum), in which case a complete filling of the open space is achieved and gas bubbles in the elastomer are avoided. A liquid filling (for example, silicone oil) could be used instead of this elastomer. The elastomer of the plug is slightly viscous during insertion, which is no problem on account of the small space which is easy to fill. This elastomer is shockproof and resistant to the effects of the aggressive gases or liquids, in particular to diesel fuel. The part of the bolt bore which is not to be filled with the elastomer material is sealed off well by the sealing ring, even if metal parts of the sensor show a difference in thermal expansion. Both elastomers are non-expanding and transmit a pressure exerted on them hydrostatically to the piezoelement.

It is pointed out that it is known per se for the formation of a pressure sensor to embed a piezoelectric pressure converter in a silicone rubber or similar material (see European patent publications EP-A-0255084 and EP-A-0145001).

DESCRIPTION OF THE DRAWINGS

Other objects, advantages and details of the invention appear in the following detailed description of preferred embodiments of the invention, the detailed description referring to the drawings in which.

DESCRIPTION OF THE PREFERRED EMBODIMENTS

Figure 1:
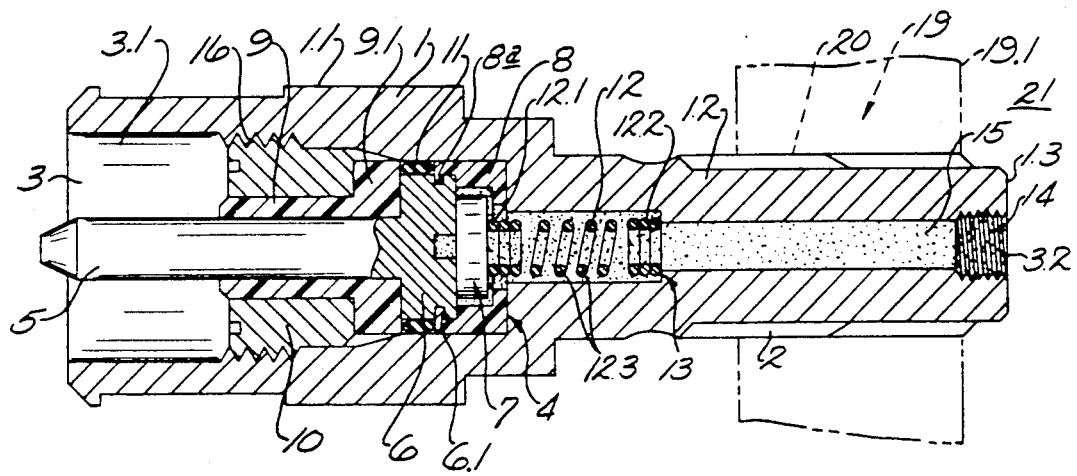
FIG. 1 is a longitudinal section view along an axis of a preferred embodiment of the invention.

The invention will now be explained with reference to the drawing figures.

The sensors shown are designed in the form of a steel screw bolt 1 with screw thread 2 and a bore 3 extending both through the bolt head 1.1 and through the bolt shank 1.2. The bolt is adapted to be threaded into bore in a wall 19.1 of a diesel pump or the like (shown in broken lines in FIG. 1) as indicated at 20 to secure the pressure in a pressure zone 21 at one side of the wall. The bolt has an internal shoulder 4 preferably at the transition from a counterbore part 3.1 of the bore in the head to the portion of the bore in the shank extending to shank end 3.2 of the bore. An electrical connecting or terminal pin 5 projects in the bore from the bolt head and can be connected, for example, by means of a female plug to an electrical measuring apparatus (normally a voltmeter not shown).

In the embodiment according to FIG. 1 the connecting pin has a head or part 6 of large diameter, against which a transducer 7 in the form of a piezoelectric wafer for example is disposed. Preferably the wafer is centered and generally positioned and retained against the head part of the terminal by an insulating or other element. Preferably the wafer is insulated from the bolt by means of the hook-shaped lips 8a of the insulating ring 8. Preferably the hook-shaped lips 8a are engaged in recesses 6.1 of the pin part 6 by swaging or the like.

An insulating sleeve or bushing 9 which is L-shaped in cross-section is pushed onto the pin 5, and a securing or lock nut 10 is screwed into internal thread 16 in the bore and grips or fits around the insulating sleeve 9 and bears against the bushing flange 9.1. An O-ring or other gasket 11 (for example, made of fluorocarbon) is placed between the insulating sleeve 9 and the spacer 8. The transducer wafer 7 (which may be any piezoelement, piezoelectric or piezoresistive or the like) is pressed by one end 12.1 of a contact spring 12 against the end face 6.2 of the head part of the connecting pin or terminal 5. This spring acts with its other end 12.2 on a second internal shoulder 13 of the bolt formed by a second intermediate counterbore. The spring is preferably electrically conductive and serves to electrically connect an opposite side of the transducer to the bolt to be connected to electrical ground. The part of the bore 3 extending between the O-ring 11 and the end face of the bolt shank is filled with a non-compressible material which can transmit pressures exerted on the end face of the bolt hydrostatically to the wafer 7. The part of this mass facing the end face 1.3 of the bolt shank comprises a plug 14 formed by a shockproof and diesel-resistant elastomer which can harden at room temperature. The remaining part of the mass could be a nonconducting fluid (for example, a silicone oil), but is preferably a two-component elastomer 15 which is poured in a water-thin form into the bore 3b and is hardened to a non-compressible gel. This gel, indicated by dots, fills the bore 3 up to the sealing ring 11 and surrounds the convolutions 12.3 of the spring. Any conventional incompressible material such as a polyurethane or the like is used for the incompressible material including any conventional material such as any conventional room temperature vulcanizable, pliant but incompressible material.

The sensor according to FIG. 1 can be easily assembled by forming a subassembly from the pin 5, the insulating sleeve 9, the sealing ring 11, the piezoelectric wafer 7 and the insulating sleeve 8. After the spring 12 has been fitted by means of the bolt head in the bore 3, the subassembly is also placed in the bore 3 and the securing nut 10 is tightened so that the spring 12 is compressed. The two components for the elastomer 15 are then poured in a water-thin form into the bore 3 and de-aerated, and the plug 14 is formed after hardening of the elastomer formed. Instead of de-aerating the two-component elastomer 15, these components can also be poured in under vacuum.

Figure 2:
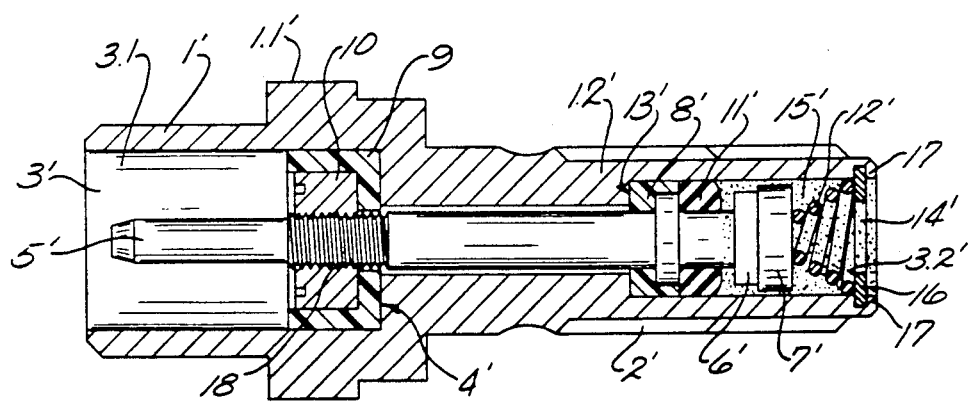
FIG. 2 is a section view similar to FIG. 1 illustrating another preferred embodiment of the invention.

In the other preferred embodiment according to FIG. 2, wherein equivalent parts are indicated by corresponding reference number, the above-mentioned subassembly in this case comprises the connecting pin 5', the insulating sleeve 8' (without lips 8a) and the sealing ring 11'. Preferably the O-ring 11' is fitted between the head 6 and a collar 22. It is placed from the end of the bolt shank in the bore 3' until the insulating sleeve 8' engages on the shoulder 13' or one counterbore. The spring 12' is then placed with a closing or split ring, spring metal retaining ring 16 or the like in the bore 3. Preferably said closing ring 16 is positioned by swaging the lips or rim 17 of the bolt disposed around the end of the bolt shank bore. After the cupshaped insulating sleeve or bushing 9' is placed in the bolt head or other cavity counterbore and a securing or lock nut 10 is tightened on the screw thread 18 of the pin 5', the shank cavity or bore 3' is filled from the end of the bolt shank up to the sealing ring 11 with a noncompressible mass, which preferably comprises in the above-mentioned manner a shockproof and diesel-resistant plug 14 sufficient to close the bore end and a two-component elastomer 15.

The sensor bolts described are very easy to manufacture in an automatic process and through their design are diesel-resistant and resistant to very high pressure differences (for example 400 to 800 bar).

Various modifications are possible within the scope of the invention. The bolts are not exclusively suitable for diesel engines, but can also be used in other internal combustion engines. It should be understood that although particular embodiments have been described for illustrating the invention, the invention includes all modifications and equivalents of the described embodiments falling within the scope of the appended claims.

We claim:

1. A sensor for measurement of a pressure medium comprising a screw-threaded bolt having a head and a shank and having a bore extending entirely through the head and shank of the bolt, a transducer comprising a piezoelement disposed within bore adapted to convert a change in applied pressure into an electrical signal, an electrical connection to the transducer leading through the bore in the head of the bolt, and an incompressible material disposed inside the bore extending from an end of the bore at the shank of the bolt to the transducer to transmit pressure force from a pressure medium at the end of the bore at the shank of the bolt to the transducer, characterized in that an electrical terminal is disposed in the bore to be accessible from an end of the bore at the head of the bolt to provide the electrical connection to the transducer, electrically insulating means are disposed intermediate the terminal and the bolt, a locking nut positions the terminal in the bore, and a contact spring disposed in the bore presses the transducer against the electrical terminal.

2. A sensor according to claim 1 wherein the incompressible material surrounds the spring to transmit the pressure force to the transducer.

3. A sensor according to claim 2 wherein the bore has a counterbore therein forming a shoulder facing toward the end of the bore at the head of the bolt, the contact spring comprises a contact spring disposed in the bore to bear against the shoulder and the transducer, and the incompressible material surrounds convolutions of the coil spring to transmit pressure force from the pressure medium to the transducer.

4. A sensor according to claim 3 wherein the terminal has a head disposed within the counterbore, and has a shank of smaller diameter extending toward the end of the bore at the head of the bolt, the transducer is pressed against the terminal head by the contact spring, the electrically insulating means comprises a bushing fitted over the terminal shank having a flange abutting the terminal head, and the locking nut threadedly engages the bolt within the bore around the electrically insulating bushing and bears against the bushing flange for positioning the terminal in the bore.

5. A sensor according to claim 4 wherein an O-ring gasket is disposed around the terminal head in sealing relation to the bolt, and the bushing flange engages the gasket to retain the gasket against pressure forces applied through the incompressible material.

6. A sensor according to claim 2 wherein the bore has first and second counterbores forming shoulders facing toward respective ends of the bore, the terminal comprises a terminal head part disposed in the first counterbore at the shank of the bolt, has a terminal shank of smaller diameter extending into the second counterbore, and has screw threads on the terminal shank in the second counterbore, the transducer is pressed against the terminal head in the first counterbore by the contact spring, the electrically insulating means comprises first and second cupshaped bushings of electrically insulating material disposed in the respective counterbores against the respective shoulders, the first bushing being disposed in the first counterbore and receiving the terminal head part therein and the second bushing being disposed in the second counterbore for receiving the locking nut therein, the locking nut threadedly engaging the screw threads on the terminal shank for positioning the terminal in the bore, and a retainer is disposed in the first counterbore to retain the contact spring pressing the transducer against the head part of the terminal.

7. A sensor according to claim 6 wherein the first counterbore has an additional shoulder disposed adjacent the end of the bore at the shank of the bolt forming a bore rim, the retainer comprises a ring disposed against the additional shoulder, the bore rim is formed over the retaining ring to retain the ring against the additional shoulder, the contact spring comprises a coil spring disposed in the first counterbore to bear against the ring and the transducer, and the incompressible material surrounds convolutions of the coil spring to transmit pressure force from the pressure medium to the transducer.

8. A sensor according to claim 7 wherein the terminal head part comprises a terminal head forming a surface for receiving the transducer, and a collar spaced from the terminal head received within the first bushing, and an O-ring gasket is disposed around the terminal between the terminal head and collar in sealing relation to the bolt so the collar and bushing engage the gasket to retain the gasket against pressure forces applied through the incompressible material.

9. Sensor for measuring the pressure of a medium, in particular for measuring the pressure in a diesel injection pump, comprising a screw bolt having a head and shank and having an axial bore extending through the entire head and shank of the bolt, a transducer placed inside said bore which can convert a pressure change into an electrical signal, an electric connection leading via an end of the bore at the bolt head to the transducer, and a noncompressible mass which is provided in the bore and extends from an opposite pressure measurement end of the bolt bore up to the transducer, characterized in that the transducer in the form of a piezoelement is pressed by a contact spring onto the end face of an electrical connecting pin projecting through the bolt head, which pin is fixed inside the cavity of the bolt head by a securing nut with the interposition of an insulating element.

10. Sensor according to claim 9, characterized in that the noncompressible mass fills the bore from an end face of the bolt shank up to a sealing ring provided round the connecting pin.

11. Sensor according to claim 10 characterized in that the noncompressible mass is made up of two parts, namely a plug made of a diesel-resistant material which is hardenable at room temperature for shutting off the end of the shank bore, and a gel-type two-component elastomer between said plug and the sealing ring.

* * * * *